United States Patent
Callahan et al.

(10) Patent No.: US 8,851,029 B2
(45) Date of Patent: Oct. 7, 2014

(54) OPPOSED-PISTON CYLINDER BORE CONSTRUCTIONS WITH SOLID LUBRICATION IN THE TOP RING REVERSAL ZONES

(75) Inventors: Brian J. Callahan, San Diego, CA (US); Eric P. Dion, Encinitas, CA (US); Harold E. McCormick, Ballwin, MO (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 13/385,127

(22) Filed: Feb. 2, 2012

(65) Prior Publication Data

US 2013/0199503 A1    Aug. 8, 2013

(51) Int. Cl.
F02B 71/04    (2006.01)
F01B 7/12    (2006.01)
F02B 75/00    (2006.01)

(52) U.S. Cl.
USPC .................. 123/46 R; 123/51 R; 123/195 HC (58) Field of Classification Search
USPC ................................. 123/51 R, 55.7, 195 HC
See application file for complete search history.

(56) References Cited

U.S. PATENT DOCUMENTS

| | | | |
|---|---|---|---|
| 3,528,394 A * | 9/1970 | Cummins | 123/51 A |
| 3,947,269 A | 3/1976 | Prasse et al. | 75/170 |
| 4,075,934 A | 2/1978 | Wacker et al. | 92/159 |
| 4,258,084 A | 3/1981 | Haydon, Sr. | 427/239 |
| 5,029,562 A | 7/1991 | Kamo | 123/193 |
| 5,408,964 A * | 4/1995 | Rao | 123/193.2 |
| 5,582,144 A | 12/1996 | Mizutani | 123/193.2 |
| 6,095,690 A | 8/2000 | Niegel et al. | 384/293 |
| 6,197,370 B1 | 3/2001 | Rao et al. | 427/236 |
| 6,253,724 B1 | 7/2001 | Han | 123/193.2 |
| 6,976,419 B1 | 12/2005 | Miyamoto et al. | 92/153 |
| 7,104,240 B1 | 9/2006 | Vuk | 123/193.2 |
| 7,171,936 B2 | 2/2007 | Rein | 123/193.4 |
| 2007/0000468 A1 | 1/2007 | Azevedo et al. | 123/193.4 |
| 2011/0094223 A1* | 4/2011 | Lemke et al. | 60/605.1 |
| 2011/0289916 A1* | 12/2011 | Dion et al. | 60/605.2 |

FOREIGN PATENT DOCUMENTS

| | | |
|---|---|---|
| GB | 2168457 A | 6/1986 |
| GB | 2171776 A | 9/1986 |
| GB | 2448544 A | 10/2008 |

OTHER PUBLICATIONS

Engineering and Design—Lubricants and Hydraulic Fluids, Publication #: EM 1110-2-1424, Feb. 28, 1999, pp. 6-1 through 6-10.
Van de Velde, et al, "The friction force during stick-slip with velocity reversal", WEAR, V. 216, I. 2, Apr. 1998, pp. 138-149.

* cited by examiner

Primary Examiner — Lindsay Low
Assistant Examiner — Syed O Hasan
(74) Attorney, Agent, or Firm — Terrance A. Meador (57) ABSTRACT

A cylinder for an opposed-piston engine is equipped with a cylinder bore that provides solid lubrication of bore/piston surface interfaces in top ring reversal zones of the cylinder bore.

13 Claims, 6 Drawing Sheets

OPPOSED-PISTON CYLINDER BORE CONSTRUCTIONS WITH SOLID LUBRICATION IN THE TOP RING REVERSAL ZONES

RELATED APPLICATIONS

This disclosure includes material related to the disclosure of commonly-owned U.S. application Ser. No. 12/931,199, filed Jan. 26, 2011 titled "Oil Retention in the Bore/Piston Interfaces of Ported Cylinders in Opposed-Piston Engines".

BACKGROUND

The field is internal combustion engines. Particularly, the field includes opposed-piston engines. In more particular applications, the field relates to a cylinder equipped with opposed pistons in which the cylinder bore has a construction providing solid lubrication of the bore/piston surface interfaces in the top ring reversal zones of the cylinder bore surface.

When compared with four-stroke engines, two-stroke opposed-piston engines have acknowledged advantages of specific output, power density, and power-to-weight ratio. For these and other reasons, after almost a century of limited use, increasing attention is being given to the utilization of opposed-piston engines in a wide variety of modern transportation applications.

Figure 1:
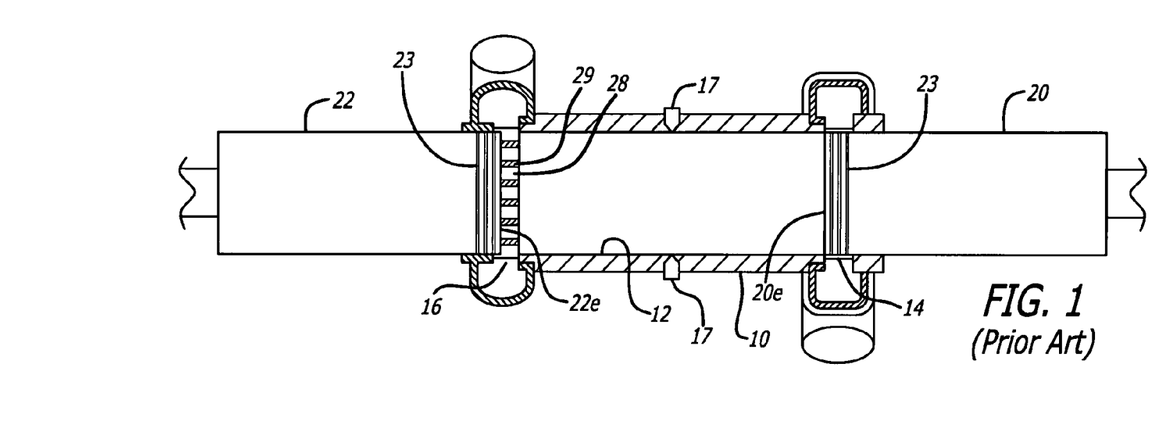
FIG. 1 is a side sectional partially schematic drawing of a cylinder of a prior art opposed-piston engine with opposed pistons near respective bottom dead center locations, and is appropriately labeled "Prior Art".
Figure 2:
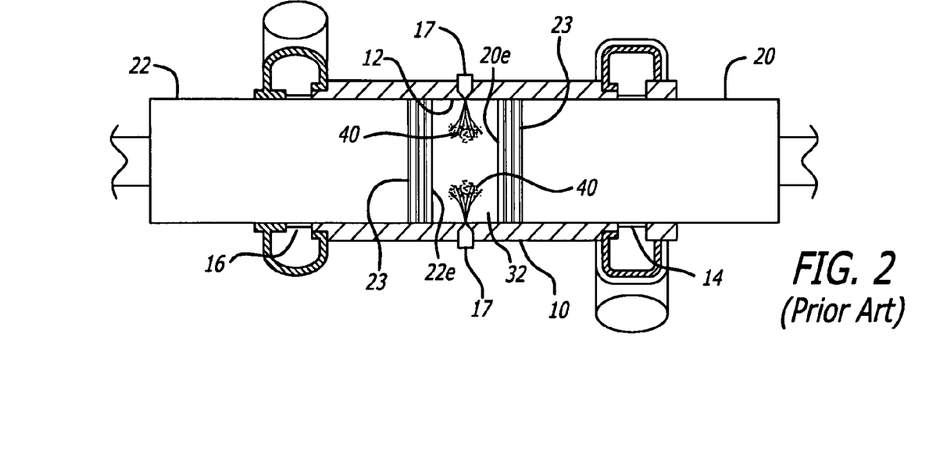
FIG. 2 is a side sectional partially schematic drawing of the cylinder of FIG. 1 with the opposed pistons near respective top dead center locations where end surfaces of the pistons define a combustion chamber, and is appropriately labeled "Prior Art".

A representative opposed-piston engine is illustrated in FIGS. 1 and 2. The opposed-piston engine includes one or more cylinders 10, each with a bore 12 and longitudinally-displaced exhaust and intake ports 14 and 16 machined or formed therein. Each of one or more fuel injector nozzles 17 is located in a respective hole that opens through the side of the cylinder; in some aspects, the holes are at or near the longitudinal center of the cylinder. Two pistons 20, 22 are disposed in the bore 12 with their end surfaces 20e, 22e in opposition to each other. For convenience, the piston 20 is referred as the "exhaust" piston because of its proximity to the exhaust port 14, and the end of the cylinder wherein the exhaust port is formed is referred to as the "exhaust end". Similarly, the piston 22 is referred as the "intake" piston because of its proximity to the intake port 16, and the corresponding end of the cylinder is the "intake end". One or more rings 23 are mounted in circumferential grooves formed in each of the pistons 20, 22 near the piston's crown.

The exhaust and intake ports 14 and 16 of the cylinder 10 seen in FIG. 1 are similarly although not necessarily identically constructed. Consequently, although only the intake port construction is visible in the figure, the following explanation pertains to the exhaust port as well. As per FIG. 1, the intake port 16 includes at least one sequence of openings 28 through the sidewall and in a peripheral direction of the cylinder 10 near the intake end of the cylinder. For example, the openings 28 extend in a circumferential direction. The openings 28 are separated by bridges 29 (sometimes called "bars"). Relatedly, the term "port" in the description to follow refers to an alternating series of openings and bridges peripherally spaced around the cylinder near one of its ends. In some descriptions the openings themselves are called ports; however, the construction of one or more peripheral sequences of such "ports" is no different than the port constructions shown in the figures to be discussed.

Operation of an opposed-piston engine with one or more cylinders 10 is well understood. With reference to FIG. 2, in response to combustion occurring between the end surfaces 20e, 22e the opposed pistons move away from respective top dead center (TDC) positions where they are at their closest positions relative to one another in the cylinder. While moving from TDC, the pistons keep their associated ports closed until they approach respective bottom dead center (BDC) positions in which they are furthest apart from each other. In a useful, but not a necessary aspect of opposed-piston engine operation, a phase offset can be introduced in the piston movements around their BDC positions so as to produce a sequence in which the exhaust port 14 opens as the exhaust piston 20 moves toward BDC while the intake port 16 is still closed so that exhaust gasses produced by combustion start to flow out of the exhaust port 14. As the pistons continue moving away from each other, the intake port 16 opens while the exhaust port 14 is still open and a charge of pressurized air ("charge air"), with or without recirculated exhaust gas, is forced into the cylinder 10. The charge air entering the cylinder drives exhaust gasses produced by combustion out of the exhaust port 14.

As per FIG. 1, presuming the phase offset mentioned above, the exhaust port 14 closes first, after the pistons reverse direction and begin moving toward TDC. The intake port 16 then closes and the charge air in the cylinder is compressed between the end surfaces 20e and 22e. As best seen in FIG. 2, as the pistons advance toward their respective TDC locations in the cylinder bore, fuel 40 (typically, but not necessarily, diesel) is injected through nozzles 17 directly into the charge air in the bore 12, between the end surfaces 20e, 22e of the pistons. The mixture of charge air and fuel is compressed in a combustion chamber 32 defined between the end surfaces 20e and 22e when the pistons 20 and 22 are near their respective TDC locations. When the mixture reaches an ignition temperature, the fuel ignites in the combustion chamber, driving the pistons apart toward their respective BDC locations.

Figure 3:
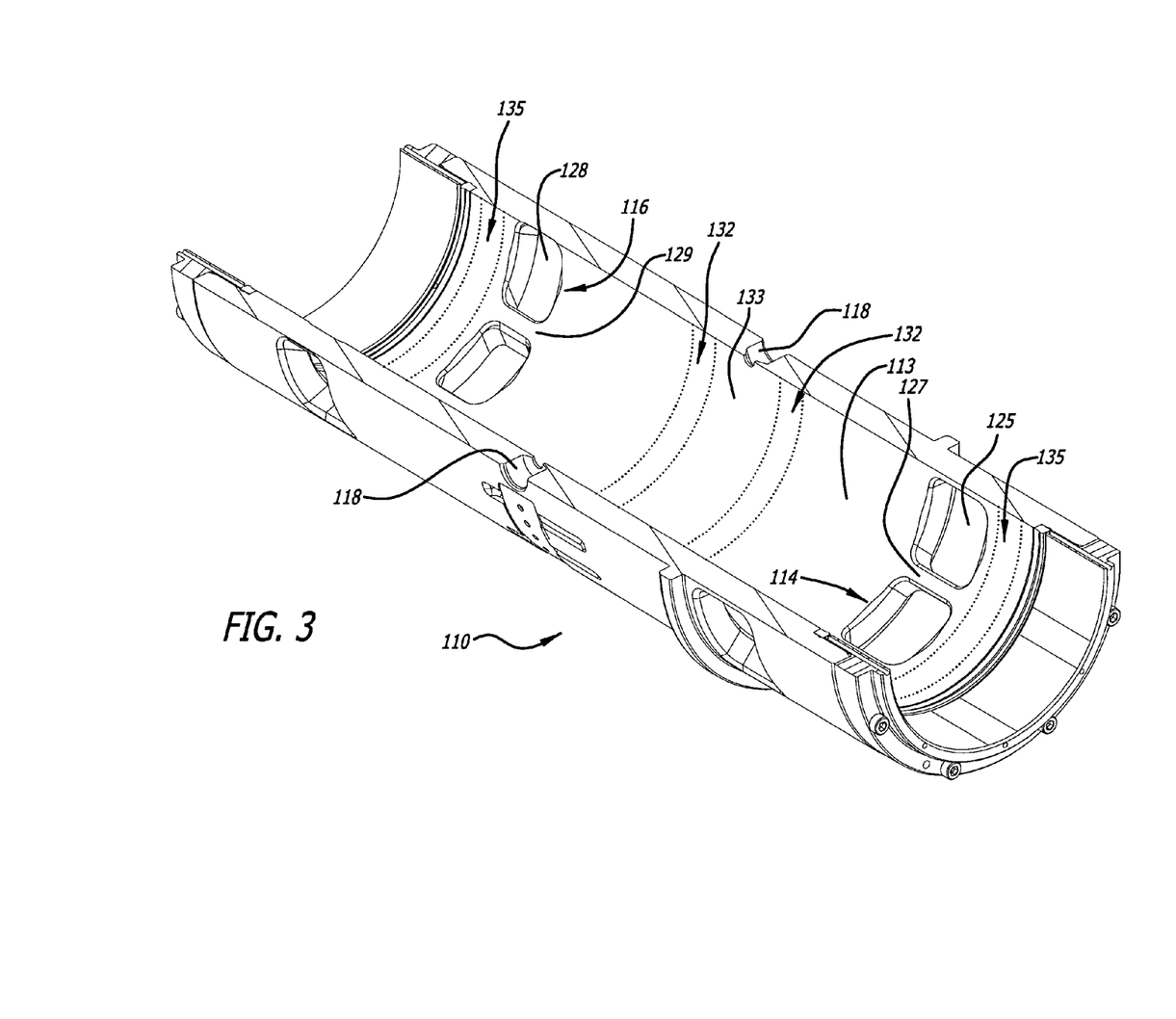
FIG. 3 is a sectional perspective view of an opposed-piston engine cylinder liner.

Preferably, although not necessarily, the construction of an opposed-piston engine cylinder includes a cylinder liner, which is a cylindrical sleeve fitted into an engine block or frame to form the cylinder. The liner can be a single piece, or it can be assembled from two or more pieces. In this regard, a single-piece liner is described in US 2010/0212613 A1 and a multi-piece liner is described in U.S. application Ser. No. 13/136,402. A cylinder liner 110 is illustrated in FIG. 3; the internal surface 113 of the liner defines the cylinder bore.

In order to increase the mechanical effectiveness and durability of an opposed-piston engine, it is desirable to reduce energy loss and wear caused by friction between the cylinder bore and the opposed pistons disposed for sliding movement therein. In the opposed-piston context illustrated in FIG. 3, areas of the cylinder bore 113 in which friction between the bore and the piston rings is particularly severe include: 1) top reversal zones 132 where the pistons reach TDC, 2) bottom reversal zones 135 where the pistons reach BDC, and 3) the port bridges 127, 129. The reversal zones are those annular sectors of the cylinder bore surface in which the pistons change direction and the reciprocating motion of the rings' sliding velocity is at zero.

At top ring reversal in any engine, sliding velocity of a piston is low while the pressure bearing the compression ring against the bore of the cylinder is high, which tends to cause a boundary lubrication condition that is metal-on-metal contact with no liquid lubricant separating the solid bodies. This boundary condition is termed dry lubrication. Movement of the piston in the bore under conditions of dry lubrication can damage the bore and/or the rings. Other undesirable effects of dry lubrication include increased friction and wear.

Current solutions employed to mitigate undesirable effects associated with dry lubrication include use of solid lubricants in the bore/piston interface. For example, grey cast iron material can be used to form the cylinder bore, which implies carbon content >2.1% and also the presence of graphite in a lamellar structure. The flake (lamellar) graphite acts as a solid lubricant that is effective in preventing scuffing and minimizing friction. However, grey iron is weak in tension, compared to steel, because the graphite flakes act as crack initiation sites and the structure does not resist crack propagation, which reduces fatigue strength of the grey cast iron material.

Figure 4:
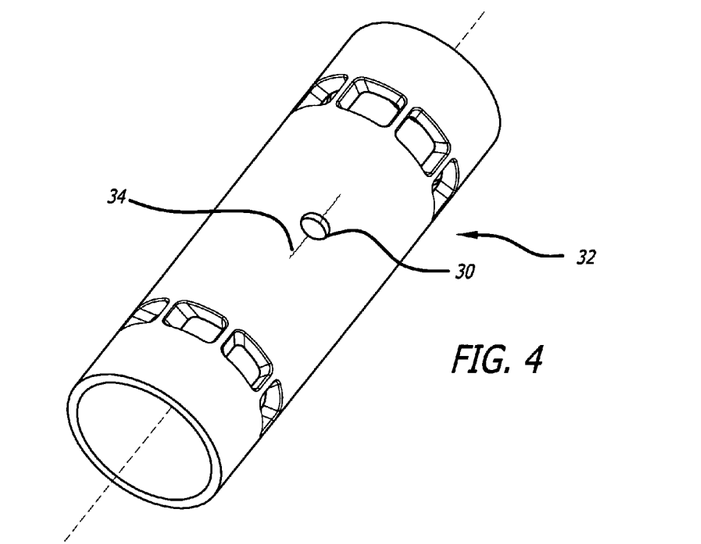
FIG. 4 is a perspective view of a cylinder liner with a radial hole drilled from the outer surface of a sidewall to the bore.

As per FIG. 4, a unique characteristic of opposed-piston engines is a requirement for at least one hole 30 through each cylinder to accommodate a fuel injector positioned between the exhaust and intake ports. In some aspects, more than one injector hole is desirable; in other aspects, additional holes may be desirable for operations such as engine braking. These holes interrupt the hoop structure of a cylinder liner 32; if the liner is made of grey iron, such holes lead to concentrated zones of tensile stress and possible lateral cracking 34 due to tensile fatigue. It therefore would be advantageous to provide a construction for a cylinder liner of an opposed-piston engine that would overcome this tensile stress condition while still reducing the effects of friction between the piston rings and the cylinder bore in the top ring reversal zones.

SUMMARY

This disclosure describes a cylinder construction for an opposed-piston engine that includes material with higher tensile strength and higher tensile fatigue strength than grey iron while providing solid lubrication in the top ring reversal zones.

Desirably, the cylinder construction includes a cylinder liner made of a steel material with a coating of solid lubricant in the bore in the top ring reversal zones.

BRIEF DESCRIPTION OF THE DRAWINGS

The below-described drawings are meant to illustrate principles and examples discussed in the following description. They are not necessarily to scale.

DETAILED DESCRIPTION OF THE PREFERRED EMBODIMENTS

FIG. 3 illustrates a cylinder liner 110 used to form a cylinder of an opposed-piston engine. The cylinder liner 110 has an internal surface 113 that defines a bore in which a pair of pistons (not shown) is disposed for slidable movement as illustrated in FIGS. 1 and 2. Exhaust and intake ports 114 and 116 are provided in respective exhaust and intake ends of the cylinder liner. The exhaust and intake ports 114, 116 are spaced apart in a longitudinal direction of the cylinder liner, and are positioned near respective ends of the cylinder liner. At least one hole 118 extends from the sidewall of the cylinder liner 110 through the internal surface for the purpose of receiving a fuel injector nozzle (not shown). In some aspects additional holes 118 are provided for fuel injection, release of gasses, and/or other purposes. In further aspects, any such hole 118 can be drilled in a radial direction of the cylinder liner 110. The exhaust port includes at least one circumferential sequence of port openings 125 which alternate with bridges 127. Similarly, the intake port 116 includes a circumferential ring of port openings 128 which alternate with bridges 129. It is typically the case that the openings 125 and bridges 127 of the exhaust port 114 have different shapes and dimensions than the intake port openings and bridges.

Two high friction zones are indicated for each piston in the bore surface 113 of the ported cylinder 110. In the top reversal zones 132, the pistons reach TDC. As per FIG. 3, the top reversal zones 132 are separated by a middle portion 133 of the bore surface. In the bottom reversal zones 135, the pistons reach BDC. As per FIG. 3, each bottom reversal zone is positioned between a respective port and the corresponding end of the cylinder.

Preferably, the cylinder liner 110 is constituted of a material incorporating steel or a steel alloy in order to eliminate the tensile stress and tensile fatigue conditions that are caused by grey iron. Such material is available with much higher tensile strength and tensile fatigue strength than grey iron, but it does not include flake or nodular graphite. However, it should be noted that without flake or nodular graphite, the cylinder bore can present a high dry friction coefficient, which increases the tendency to scuff and which also increases engine power lost to friction in the piston/bore interface. A solution to the poor tribological condition of the bore surface of a cylinder liner made with steel or steel alloy is to coat the surface with a material incorporating a solid lubricant, preferably in the form of a highly temperature resistant coating having a low dry friction coefficient. For example, a coating of material incorporating a solid lubricant can be applied to the bore surface by electroplating with a material such as a nickel-silicon carbide or nickel-phosphorous silicon carbide. Another solution is to apply a layer of material incorporating a solid lubricant by spray coating the bore. For example, the bore can be sprayed with an iron-based solid lubricant. For another example, the bore can be sprayed with solid lubricant constituted of a metal alloy such as Ni—Mo—Al—CrO—Ba$_2$F—Ca$_2$F—Ag, or Mo+NiCrBS. Hereinafter the term "solid lubricant material" denotes a material that is, or that incorporates, a solid lubricant.

However, it should also be noted that application of a coating of solid lubricant material to the bore surface of a steel cylinder liner can produce undesirable effects during operation of the engine and/or manufacture of the liner.

Figures 5A, 5B:
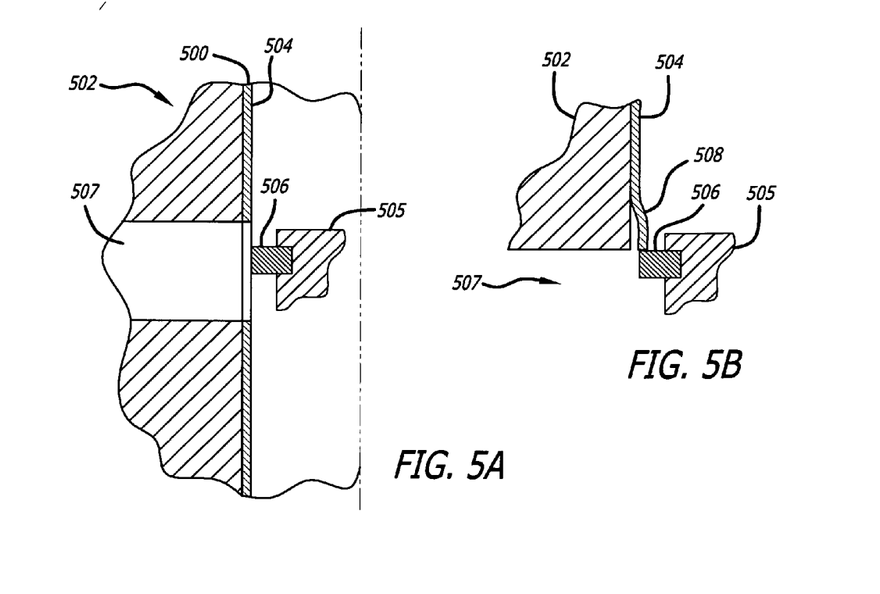
FIGS. 5A and 5B are schematic illustrations showing undesirable peeling caused by a piston ring as it transits a port of a cylinder liner having a bore coated with a solid lubricant.

One undesirable effect encountered during operation of an opposed-piston engine is illustrated in FIGS. 5A and 5B in which the bore surface 500 of a cylinder liner 502 formed of a steel material is coated with a layer 504 of solid lubricant material. As a piston 505 traverses a port opening 507 of the cylinder liner, a piston ring, for example a compression ring 506, applies a shear load that tends to peel the layer at 508.

Figure 6A:
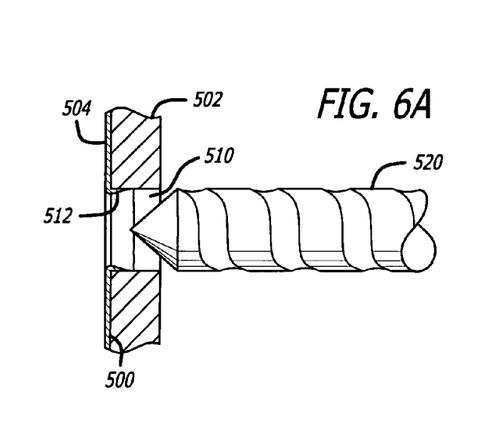
FIGS. 6A and 6B illustrate undesirable peeling produced by a first method of cutting a hole through a cylinder liner having a bore coated with a solid lubricant.
Figure 6B:
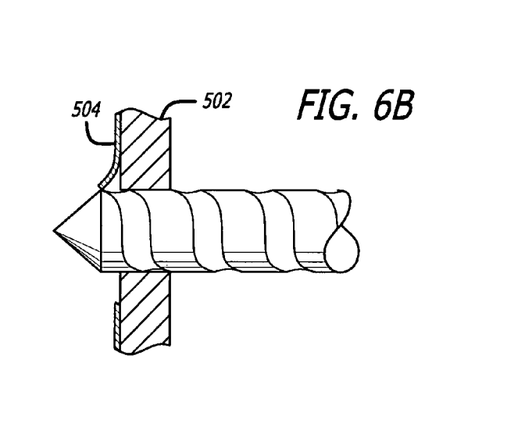
Figure 7A:
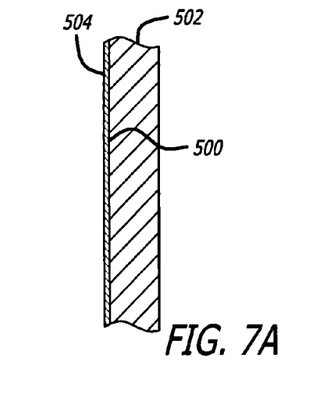
FIGS. 7A, 7B, and 7C illustrate undesirable peeling produced by a second method of cutting a hole through a cylinder liner having a bore coated with a solid lubricant.
Figure 7B:
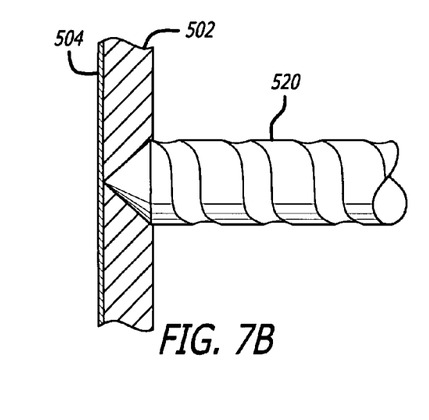
Figure 7C:
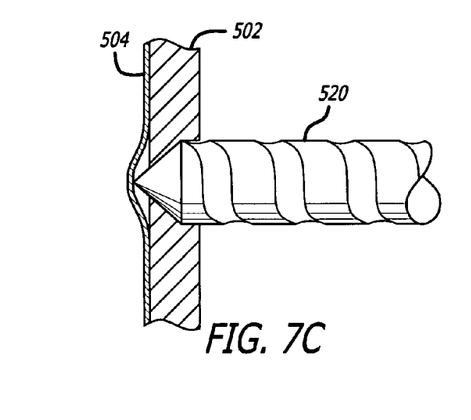

An undesirable effect is also encountered when forming a hole in a cylinder liner during manufacture of a cylinder. In a first case, illustrated in FIGS. 6A and 6B, a hole 512 is first formed through the sidewall of the cylinder liner 502 using a cutting tool 520. Following formation of the hole 512, the bore surface 500 is coated with a layer 504 of solid lubricant material. The coating procedure can result in a portion 512 of the layer 504 extending into the hole 512, If the hole 512 must be machined again, or threaded, after the coating procedure, the cutting tool 520 can chip and/or peel the coating as illustrated in FIG. 6B. In a second case, illustrated in FIGS. 7A, 7B, and 7C, even if the layer 504 is applied before machining the hole 512, peeling or chipping of the layer can occur during the hole machining, as illustrated in FIG. 7C.

Figure 8A:
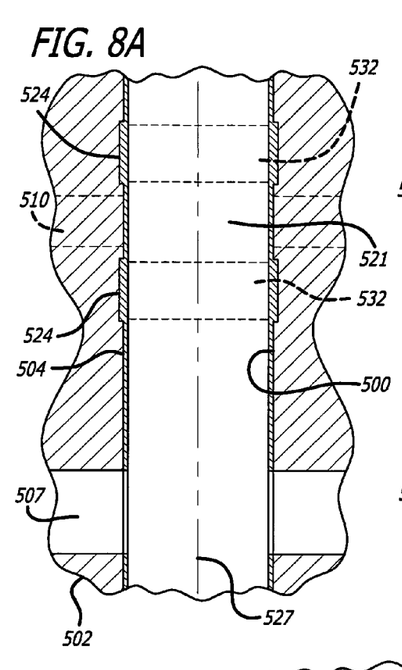
FIGS. 8A, 8B, and 8C illustrate a cylinder liner embodiment providing solid lubrication in the top ring reversal zones.
Figure 8B:
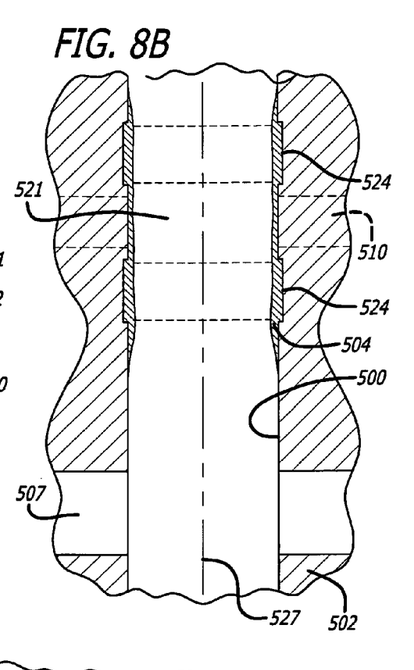
Figure 8C:
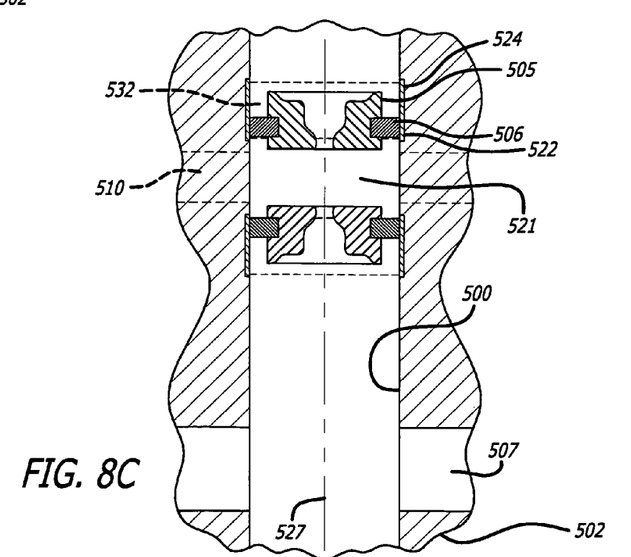

A solution that reduces or eliminates undesirable chipping and peeling of a layer of solid lubricant material can be implemented during the manufacture of a cylinder liner. FIGS. 8A, 8B, and 8C represent the opposed-piston cylinder liner 502 and show the location of at least one port 507. At least hole 510 is to be provided in an annular portion 521 of the bore surface 500 that is located between top ring reversal zones 532. Prior to application of a layer of a solid lubricant material on the bore surface, an annular groove 524 is machined into the bore surface 500 on each side of the annular portion 521, in alignment with a respective top ring reversal zone 532. In width, at least a portion of each annular groove 524 overlaps a respective top ring reversal area 532; in some aspects, as shown, each annular groove 524 spans substantially all, or all, of a respective top ring reversal zone 532. Preferably, each annular groove 524 is oriented so as to be positioned orthogonally with respect to the axis 527 of the cylinder liner 502. However in some aspects one or both of the annular grooves 524 can be disposed in a non-orthogonal orientation with respect to the axis 527. A layer 504 of solid lubricant material is then applied to the bore surface 500. As per FIG. 8A, the layer 504 extends over substantially the entire bore surface 500; as per FIG. 8B, the layer 504 is applied only over only an annular portion of the bore surface; in all cases, the layer 504 covers the annular grooves 524 such that each groove contains the solid lubricant material. As per FIG. 8C, the bore is then honed to remove all solid lubricant material except that contained in the annular grooves 524. As can be appreciated with reference to FIG. 8C, the provision of an annular groove in the bore surface 500 of the cylinder liner provides a receptacle for solid lubricant material that is integrated into the bore surface at a desired bore surface location. No portion of the layer is left on the bore surface 500 in the vicinities of the exhaust and intake ports, thereby eliminating cracking and or peeling effects in the layer as the pistons traverse the ports. Furthermore, by positioning the grooves 524 away from the hole edges, after honing the cylinder bore a dry lubricant area will be present in the top ring reversal zones 532 of the pistons' compression rings 506 as illustrated in FIG. BC. The dry lubricant areas presented by the solid lubricant material in the grooves 524 are aligned with top ring reversal zones 532, and are disposed on respective sides of the annular bore portion 521 containing the one or more holes 510.

Figure 9A:
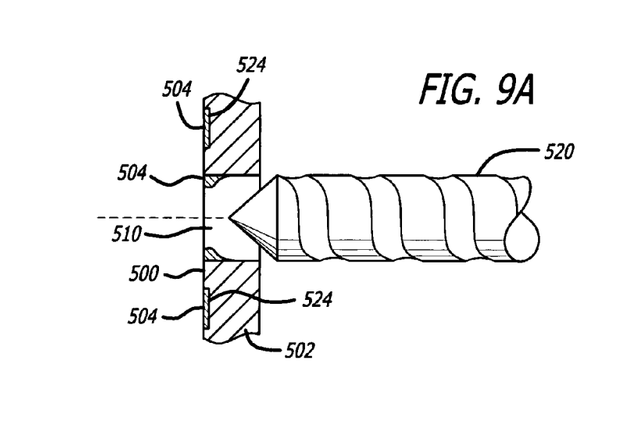
FIGS. 9A and 9B illustrate elimination of undesirable peeling produced by the first method of cutting a hole through a cylinder liner having a bore coated with a solid lubricant.
Figure 9B:
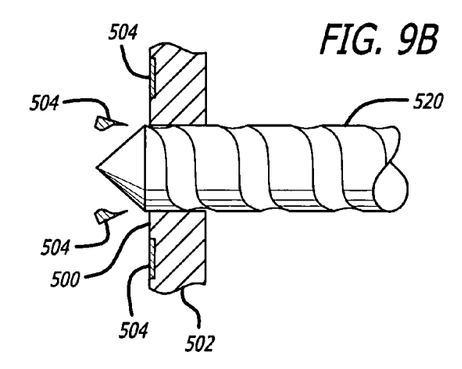
Figure 10A:
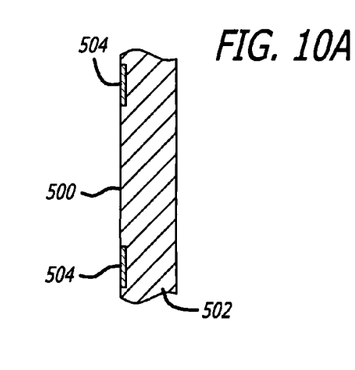
FIGS. 10A and 10B illustrate elimination of undesirable peeling produced by the second method of cutting a hole through a cylinder liner having a bore coated with a solid lubricant.
Figure 10B:
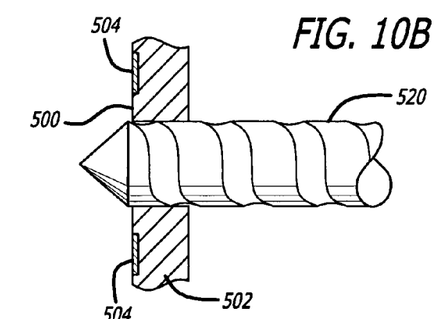

With the manufacturing sequence illustrated in FIGS. 8A, 8B and 8C, one or more holes 510 can be formed in the annular portion 521 either before or after the layer 504 is applied. If a hole 510 is formed before application of a layer 504, further machining, honing, and/or threading of the hole after the cylinder bore 500 is honed, will remove any solid lubricant material in the hole as illustrated in FIG. 9A and 9B, without causing the material in the grooves 524 to crack or peel. Alternately, as illustrated in FIGS. 10A and 10B, if a hole 510 is formed, honed, and/or threaded after a layer 504 is applied and the cylinder bore 500 is honed, the tool 520 will not make contact with the annular grooves 524 and so will not cause peeling or cracking during hole formation. Further, note that in FIG. 8C, the layer of solid lubricant material 504 does not extend to the port openings 507 in either of the exhaust and intake ports, thereby eliminating cracking and peeling at the port opening edges during engine operation.

Although the disclosure refers to a number of described embodiments, it should be understood that various modifications can be made to the principles set forth without departing from the spirit of the disclosure. For example, although the examples and embodiments described and illustrated herein include references to a single compression ring 506 on each piston 505, this is merely for ease of explanation. In fact each piston can include other rings as well. Further, although the examples and embodiments described and illustrated herein include references to solid lubricant material and to dry lubrication, this is not meant to exclude the use of other lubricants, including liquid lubricants such as oil. Furthermore, although the examples and embodiments described and illustrated herein include two annular grooves, each aligned with a respective top ring reversal zone, this is not meant to exclude the provision of a single annular groove filled with a solid lubricant and aligned with one top ring reversal zone. Moreover, although the annular grooves are illustrated as having rectangular cross sections with smooth sides and floors, this is not meant to exclude other cross sectional outlines and/or sides and walls with non-smooth surfaces.

The invention claimed is:

1. An opposed piston engine having at least one cylinder with a bore surface for supporting sliding movement of a pair of opposed pistons, in which the bore surface comprises a solid lubricant material disposed in at least one of a first and a second top ring reversal zone and the cylinder includes at least one hole positioned between the top ring reversal zones for supporting a fuel injector nozzle, wherein:
   the solid lubricant material is disposed in a first annular portion of the bore positioned on a first side of the hole and in a second annular portion of the bore positioned on a second side of the hole; and,
   the first and second annular portions are separated by a third annular portion of the bore that does not comprise the solid lubricant material.

2. A cylinder, comprising:
   longitudinally-spaced exhaust and intake ports;
   a bore with a surface for supporting sliding movement of a pair of opposed pistons, the bore comprising a solid lubricant material disposed in each of a first and a second top ring reversal zone; and
   at least one injector hole positioned between the top ring reversal zones in which the solid lubricant material is disposed in a first annular portion of the bore positioned on a first side of the hole and in a second annular portion of the bore positioned on a second side of the hole, and the first and second annular portions are separated by a third annular portion of the bore that does not comprise the solid lubricant material.

3. A cylinder liner for an opposed-piston engine, comprising:
 longitudinally-spaced exhaust and intake ports;
 a bore with a surface for supporting sliding movement of a pair of opposed pistons;
 a coating layer comprising a solid lubricant material disposed respectively in a first top ring reversal zone of the bore;
 a coating layer comprising the solid lubricant material disposed respectively in a second top ring reversal zone of the bore; and
 at least one injector hole positioned in a zone of the bore between the top ring reversal zones that does not comprise a coating of the solid lubricant material.

4. The cylinder liner of claim 3, in which the solid lubricant material is disposed in each of a pair of spaced-apart annular grooves in the surface.

5. The cylinder liner of claim 4, in which the hole is positioned between the annular grooves.

6. The cylinder liner of claim 3, in which the solid lubricant material is disposed in a first annular portion of the bore positioned on a first side of the hole and in a second annular portion of the bore positioned on a second side of the hole.

7. The cylinder liner of claim 3, the cylinder liner comprising a steel material.

8. The cylinder liner of claim 3, the solid lubricant comprising a nickel-silicon carbide or nickel-phosphorous silicon carbide.

9. The cylinder liner of claim 3, the solid lubricant comprising an iron-based material.

10. The cylinder liner of claim 3, the solid lubricant material comprising Ni—Mo—Al—CrO—$Ba_2F$—$Ca_2F$—Ag or Mo+NiCrBS.

11. The cylinder liner of claim 3, the solid lubricant comprising a temperature resistant coating having a low dry friction coefficient.

12. A method of coating discrete ring reversal zones in the surface of the bore of an opposed-piston cylinder, comprising:
 forming at least one annular groove in the bore surface that is aligned with a ring reversal zone and located in the vicinity of a hole location in a sidewall of the cylinder;
 applying a layer of solid lubricant material to the bore surface and extending at least over the annular groove; and,
 removing solid lubricant material from the bore surface while leaving the solid lubricant material in the at least one annular groove.

13. The method of claim 12, wherein forming at least one annular groove includes forming a respective annular groove in each of first and second top ring reversal zones, in the vicinity of a hole positioned between the top ring reversal zones.

* * * * *